United States Patent
Waldmeier et al.

(10) Patent No.: US 11,886,465 B1
(45) Date of Patent: Jan. 30, 2024

(54) METHODS AND SYSTEMS FOR ELECTRONIC GENERATION OF NARRATIVES

(71) Applicant: UIPCO, LLC, San Antonio, TX (US)

(72) Inventors: Michael James Waldmeier, Helotes, TX (US); John Luke Horgan, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 582 days.

(21) Appl. No.: 15/583,606

(22) Filed: May 1, 2017

Related U.S. Application Data

(60) Provisional application No. 62/333,596, filed on May 9, 2016.

(51) Int. Cl.
*G06F 16/28* (2019.01)
*G06F 3/0486* (2013.01)
*G06F 3/0482* (2013.01)
*G06N 20/00* (2019.01)

(52) U.S. Cl.
CPC .......... *G06F 16/285* (2019.01); *G06F 3/0482* (2013.01); *G06F 3/0486* (2013.01); *G06N 20/00* (2019.01)

(58) Field of Classification Search
CPC .... G06F 16/285; G06F 3/0486; G06F 3/0482; G06F 17/30; G06N 20/00
USPC ......................................................... 707/737
See application file for complete search history.

(56) References Cited

U.S. PATENT DOCUMENTS

| | | | |
|---|---|---|---|
| 8,108,301 B2 * | 1/2012 | Gupta ................... | G06Q 20/10 705/38 |
| 2009/0112753 A1 * | 4/2009 | Gupta ................... | G06Q 40/02 705/38 |
| 2015/0032675 A1 * | 1/2015 | Huehn ................... | G06Q 50/01 707/740 |

* cited by examiner

*Primary Examiner* — Hosain T Alam
*Assistant Examiner* — Tracy M McGhee
(74) *Attorney, Agent, or Firm* — PERKINS COIE LLP

(57) ABSTRACT

Methods and systems described in this disclosure are directed to electronically generating narratives and tracking a user's actions in responses to receiving the narratives. The disclosed system can rank narratives for effectiveness of a narrative based on the responses. In some embodiments, the narratives can be classified into categories based on criteria pertaining to user population data or user-specific data.

20 Claims, 8 Drawing Sheets

Decision Tree

400

402

Metrics

+ R&D
+ RevDev
+ What's Left
+ DDoS
- Savings Booster
  + App
  - Member
    *Savings*
    *Views*
    *Rules*

404

Description

Metrics definitions will appear here when selected

Stories

+ R&D
+ RevDev
+ What's Left
+ DDoS
- Savings Booster
  > Ttl_Saved_High_Mbr
  > Ttl_Saved_High_Avg_Mbr

Description

Examples

FIG. 4

Story Creation

Ttl_Saved_High_Avg_Mbr — 510

- Congrats, your savings of *Savings_Booster/Member/Savings* is higher than your average.
- You had a pretty successful week with a savings of *Savings_Booster/Member/Savings - Savings_Booster/Member Savings/Avg*) more than your average.
- Your average savings is *Savings_Booster/Member/Savings/Avg*

Stories

+ R&D
+ RevDev
+ What's Left
+ DDoS
− Savings Booster
   > Ttl_Saved_High_Mbr
   > Ttl_Saved_High_Avg_Mbr

| Description | Examples |
|---|---|
| A member has saved more this week than his average. | • Congrats, your savings of *Savings_Booster/Member/Savings* is higher than your average.<br>• You had a pretty successful week with a savings of *Savings_Booster/Member/Savings - Savings_Booster/Member Savings/Avg*) more than your average.<br>• This week you saved (*Savings_Booster/Member/Savings - Savings_Booster/Avg*) more than your average. |

512 (points to Examples)

Metrics

+ R&D
+ RevDev
+ What's Left
+ DDoS
− Savings Booster
  + App
  − Member
    Savings
    Views
    Rules

Description

Metrics definitions will appear here when selected

FIG. 5C

METHODS AND SYSTEMS FOR ELECTRONIC GENERATION OF NARRATIVES

CROSS-REFERENCE TO RELATED APPLICATIONS

This application is a non-provisional of and claims priority to U.S. Provisional Application No. 62/333,596, filed on May 9, 2016, entitled "METHODS AND SYSTEMS FOR ELECTRONIC GENERATION OF NARRATIVES," which is hereby incorporated by reference in its entirety for all purposes.

TECHNICAL FIELD

Various embodiments of the present disclosure relate generally to electronic generation of narratives. More specifically, various embodiments of the present disclosure relate to methods and systems for electronically generating narratives and tracking actions taken by a user to selected narratives customized for the user.

BACKGROUND

Traditionally, a human being views, assesses, and examines data to generate insights and analytics from a data set. Such assessment can be done, for example, by applying complex analytical tools and/or spreadsheets to the data set. Analyzing large sets of data can require extensive time and resources. Further, complex analytics may not be easily communicated and understood by an average user who is not a data scientist or a computer programmer.

BRIEF DESCRIPTION OF THE DRAWINGS

Embodiments of the present disclosure will be described and explained through the use of the accompanying drawings in which:

FIG. 4 is a screenshot of an interface associated with the narrative generation platform in accordance with various embodiments of the present disclosure;

FIGS. 5A-5C are screenshots of interfaces showing an example narrative generation in accordance with various embodiments of the present disclosure.

DETAILED DESCRIPTION

Figure 1:
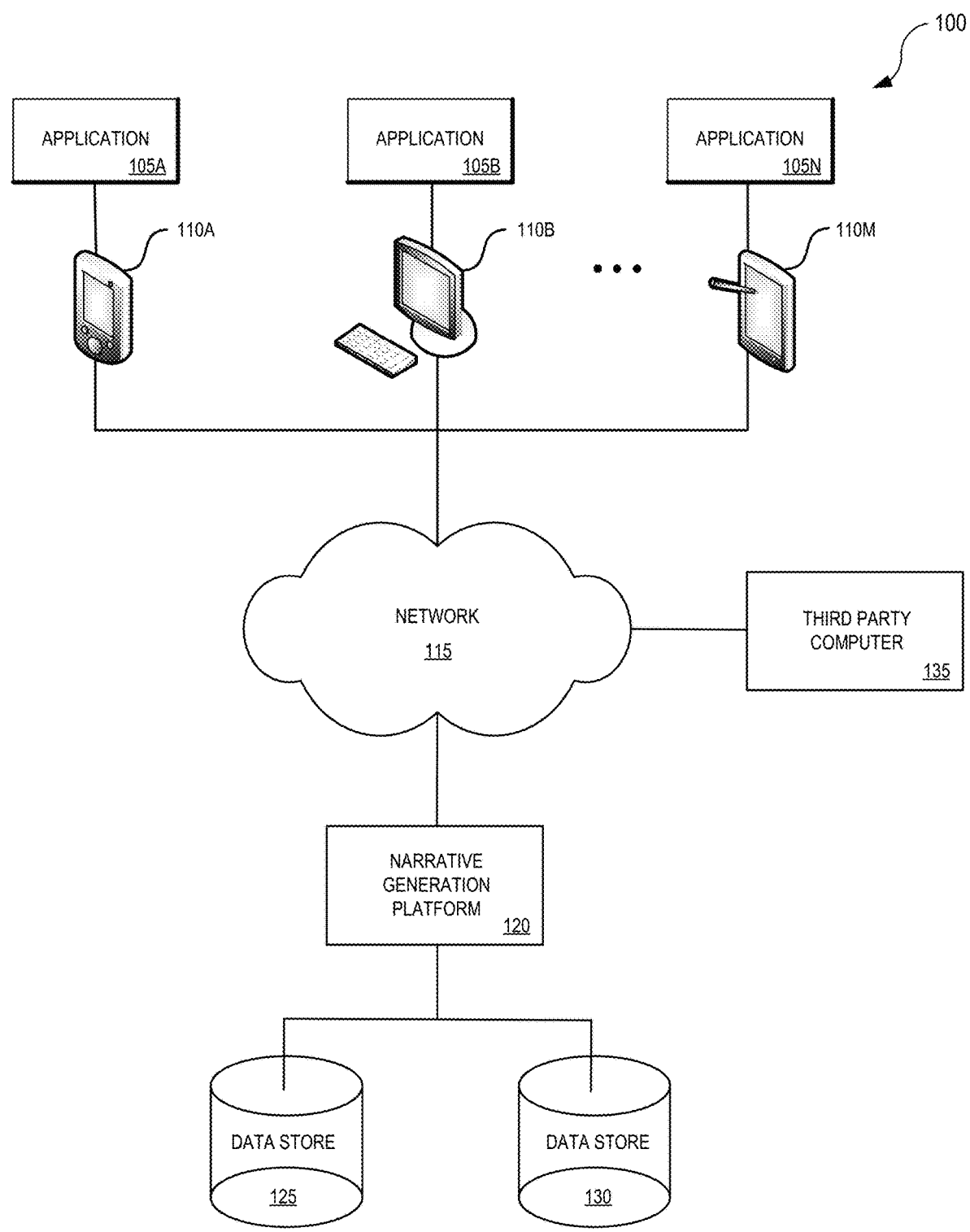
FIG. 1 illustrates an example of a network-based operating environment in accordance with various embodiments of the present disclosure.

Various embodiments of the present disclosure relate generally to an electronic (automated) tool for the generation of narratives that are easily understood and communicated by average users based on collected data. A narrative can be, for example, one or more sentences that can be included in an email, displayable on a website or a mobile application, or included as part of an electronic document for distribution and use. The narratives can be, for example, related to best-practice recommendations or suggestions for goods or services. By tracking user response to the narratives, organizations can determine which narratives are most effective in eliciting reactions or feedback from users. Thus, embodiments of the present disclosure provide a way for users to create, deploy, and analyze test results of targeted narratives with little effort.

Conventionally, organizations overload consumers with information that is not effective in eliciting reactions from users. On the contrary, narratives that are customized to a user (e.g., preferences, financial status, age, goals, habits, and other such information) are more likely to generate attention from users. Embodiments of the present disclosure are directed at automatic generation of narratives and their deployment in a user population for testing which narrative(s) is/are likely to elicit responses, feedback, or actions from users. Furthermore, embodiments of the present disclosure use machine learning methods to identify trends and patterns in user data. User data can be historical data or real-time data relating to a user's financial history, personal data, or demographics. For example, user data can be used to determine that if a user's average monthly income is above a threshold amount, then deploying a first narrative is more likely to be effective.

The user data can be collected from users by an entity or organization that runs the disclosed system. In some embodiments, such data can be publicly or privately available information provided by third parties to the entity or organization that runs the disclosed system. In accordance with disclosed embodiments, there is no limitation on data type, data format, data variables, data size, data structures, data schema or the sources that provide the data. Further, the disclosed tool can apply to data of any size and thus offers robustness and scalability to any size of data set.

One of the technological advances of some embodiments of automatic narrative generation is the time savings and reduced amount of manpower and resources used to test the specific structure and content of information that is likely to elicit maximum interest and response from users (e.g., consumers of goods or services). Typically, personnel from an IT department, a data analytics team, or a marketing department are involved in determining "what comments/statements" are most effective in generating attention from consumers. The disclosed technology provides an advantage in that a manager or a departmental head can create and deploy narratives without relying on the help of other departments (e.g., IT) or market research divisions external or internal to a company or an organization. Such capabilities can benefit organizations by keeping the organization's business intelligence internal to the organization without sharing such "secret" business data with outside vendors or third parties.

Other examples of the technological advancement include, but are not limited to, the following: 1) the capability to integrate the auto-generated narratives into any document or communication; 2) the capability to integrate the generated narratives with third party software and applications for mobile and/or web; 3) a machine-generated way to measure results from deploying different narratives to a user population without incurring the high costs of a pilot program, marketing campaign, or advertisements; and 4) a mechanism to detect trackable actions from users.

In some embodiments, an operator can classify the generated narrative into separate "buckets" or "categories" based on user population criteria or user-specific criteria, or a combination thereof. For example, a first narrative can be deployed to a subset of users whose income is above a threshold amount. The operator can deploy a second narrative to a subset of the user group who satisfy an income-based condition (e.g., income is greater than a threshold) and a family-based condition (e.g., the user has one or more children). Thus, a bucket or category can be associated with variables in the user population criteria and/or user-specific criteria. For example, if the person is in a certain age group and has an income that exceeds a threshold amount, then the person will receive narratives in a bucket associated with these criteria. Such deployment can be based on randomly selecting a narrative in that bucket. In some embodiments, selection of narratives is not necessarily random, and additional user-specific criteria can be used to select a narrative from the set of narratives in a bucket.

In some embodiments, the narratives can be deployed to a user pool, and user responses (or lack of responses) to the deployed narratives can be tracked. Such tracking can help with generating metrics, analytics, or, more generally, gaining valuable insights from the data. In some embodiments, such insights can gauge or determine the effectiveness of the deployed narratives to a user population. For example, it can be determined that a particular sentence is more effective (over other similar sentences) on users who satisfy certain demographic criteria. It can be logged, for example, how many users have responded to a narrative by clicking on a link or signing up with a program, or have taken any other user action(s). In some embodiments, an action of taking no action (e.g., not clicking on a link) can be tracked by the system.

In some embodiments, the disclosed system can provide recommendations to users based on user population data or user-specific data. Such recommendations, for example, can be when to buy certain goods and/or services, when to pay credit card bills, which credit cards to pay, an amount indicating how much to pay, one or more financial instruments that might be suited for a user, which credit card(s) to sign up for based on annual APR or other card incentives, or any other recommendation(s). These recommendations can be narratives themselves or can be appended to one or more narratives. For example, the system can use business logic to identify users who are less than thirty years old and earn between $75,000 to $100,000 a year. Accordingly, the system can generate the following narrative: "You are <member age> years old. Based on your age and your income, we recommend that you change your investment strategy to include <first percentage> in stocks and <second percentage> in bonds." The member age variable can be assigned to the age of the user, stored as part of a user profile in a database. The first percentage and second percentage can be calculated by the system a priori or in real time based on pre-stored user population data and/or incoming user data that is newly received by the system.

The terms "member" and "user" used herein have been used somewhat interchangeably and refer generally to individuals who utilize some products, goods, or services (e.g., offered by a company, an organization, or an entity) and are meant to respond (or, in some scenarios, not respond) to one or more narratives that they receive. In a different context and as used herein, the term "user" can also refer to a computer, mobile application, or human being that uses the disclosed tool for generating narratives. Such a distinction in the term "user" should be apparent to the reader based on the associated context. In the following description, for the purposes of explanation, numerous specific details are set forth in order to provide a thorough understanding of embodiments of the present disclosure. However, it will be apparent to someone skilled in the art of reading the disclosure that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other types of medium or machine-readable medium suitable for storing electronic instructions.

FIG. 1 illustrates an example of network-based operating environment 100 in which some embodiments of the present disclosure may be used. As illustrated in FIG. 1, operating environment 100 may include applications 105A-105N running on one or more computing devices 110A-110M (such as a mobile device; a mobile phone; a telephone; a tablet computer; a mobile media device; a mobile gaming device; a vehicle-based computer; a dedicated terminal; a public terminal, desktop, or laptop computer; a kiosk; wearable devices such as a smartwatch; etc.). In some embodiments, applications 105A-105N may be stored on one or more computing devices 110A-110M or may be stored remotely on a server (in the "cloud"). These computing devices can include mechanisms for receiving and sending traffic by connecting through network 115 to narrative generation platform 120 and data stores 125 and 130.

Computing devices 110A-110M may be configured to communicate via network 115 with narrative generation platform 120. In some embodiments, computing devices 110A-110M can retrieve or submit information to narrative generation platform 120 and run one or more applications with customized content retrieved by narrative generation platform 120 and data stores 125 and 130. For example, computing devices 110A-110M can execute a browser application or a customized client application to enable interaction between computing devices 110A-110M, narrative generation platform 120, third party computer 135, and data stores 125 and 130. In some embodiments, narrative generation platform 120 can be a server located remotely from the electronic devices.

Narrative generation platform 120 can be running on one or more servers and can be used to automatically generate narratives that are delivered to users via computing devices 110A-110M, track actions performed by users at third party computers 135, and/or perform other activities. In some embodiments, the generated narratives can be in the form of questions or statements in any language (e.g., English). A user receiving a narrative deployed as a question can provide an answer to the question included in the narrative or provide a selection (e.g., user-supplied option) related to such question. In some embodiments, responses collected from users to one or more narratives can be used to improve an existing product, service, or feature. For example, responses to a narrative can be used to improve the appearance or content of a mobile application or information displayed on a website. In some embodiments, a narrative can be embedded into other applications or programs. For example, a narrative can be integrated into a financial calculator. In some embodiments, a narrative can suggest that a user use a financial readiness score (FRS) tool to assess his or her financial security.

In some embodiments, the disclosed system logs which narratives were deployed to users and which of the deployed narratives are more effective in receiving user responses. For example, the system may deploy three narratives for the same user subgroup where the narratives are different in format, language, or presentation but have similar context. Based on tracking how users in this subgroup respond to the three narratives, the system can determine that one of the three narratives is more effective in eliciting user response or feedback. In some embodiments, different narratives to different user subgroups can be deployed. Further, in some embodiments, the system can refine the "winner narrative" (e.g., the most effective narrative or the most popular) by factoring in user data collected from the user subgroups. Thus, the present system allows a continuous refinement of deployed narratives based on reactions, votes, ratings, rankings, or feedback collected from users. This results in a system that can be continually improved/refined to generate effective narratives in a "closed loop" manner. Feedback from users can be received in real time, non-real time, or almost real time. This feedback can, for example, be used to dynamically refine pre-created narratives. In some embodiments, deployed narratives are not necessarily refined (based on user feedback) and, in such embodiments, are more "open loop" in operation.

In some embodiments, the disclosed system uses machine learning methodologies (e.g., based on artificial intelligence or neural networks) and statistical computing techniques to generate narratives or evolve/refine existing narratives to produce highly effective narratives. In some embodiments, the disclosed system utilizes natural language processing methodologies for electronic narrative generation and/or refinement of existing narratives. In some embodiments, the system identifies a best time of the day or the month that indicates when a narrative should be deployed. For example, if the system determines that a user receives a salary paycheck bi-monthly into his or her checking account, then the system can generate a narrative suggesting that the user transfer money from the checking account into a savings account within a day or two of receiving the salary paycheck.

Third party computer 135 stores clickable links and application programs associated with third parties (e.g., banks, financial institutions, insurance providers), and such links and programs allow users to complete actions. For example, third party computer 135 can store media (e.g., videos, text files) or access to accounts that the user may need to access for performing an action. Actions taken by users can be voluntary or compulsory.

Network 115 can be any combination of Local Area Networks (LANs) and/or Wide Area Networks (WANs) and use wired and/or wireless communication systems. Network 115 can be or could use any one or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transfer protocol (HTTP), simple mail transfer protocol (SMTP), and file transfer protocol (FTP). Data exchanged over network 115 may be represented using technologies, languages, and/or formats, including hypertext markup language (HTML) or extensible markup language (XML). In addition, all or some links can be encrypted using conventional encryption technologies such as secure sockets layer (SSL), transport layer security (TLS), and Internet Protocol security (IPsec).

Data stores 125 and 130 can be used to manage storage and access to user data such as user profiles; trends and patterns identified by applying machine intelligence on user data; a user's financial and personal data; data related to actions completed or to be completed by a user; data received from third parties; data related to user categories; narratives deployed to users; information identifying which narratives are more effective; and other information. Data stores 125 and 130 may be a data repository of a set of integrated objects that are modeled using classes defined in database schemas. Data stores 125 and 130 may further include flat files that can store data. Narrative generation platform 120 and/or other servers may collect and/or access data from data stores 125 and 130. Information provided by users can be stored in data stores 125 and 130.

Figure 2:
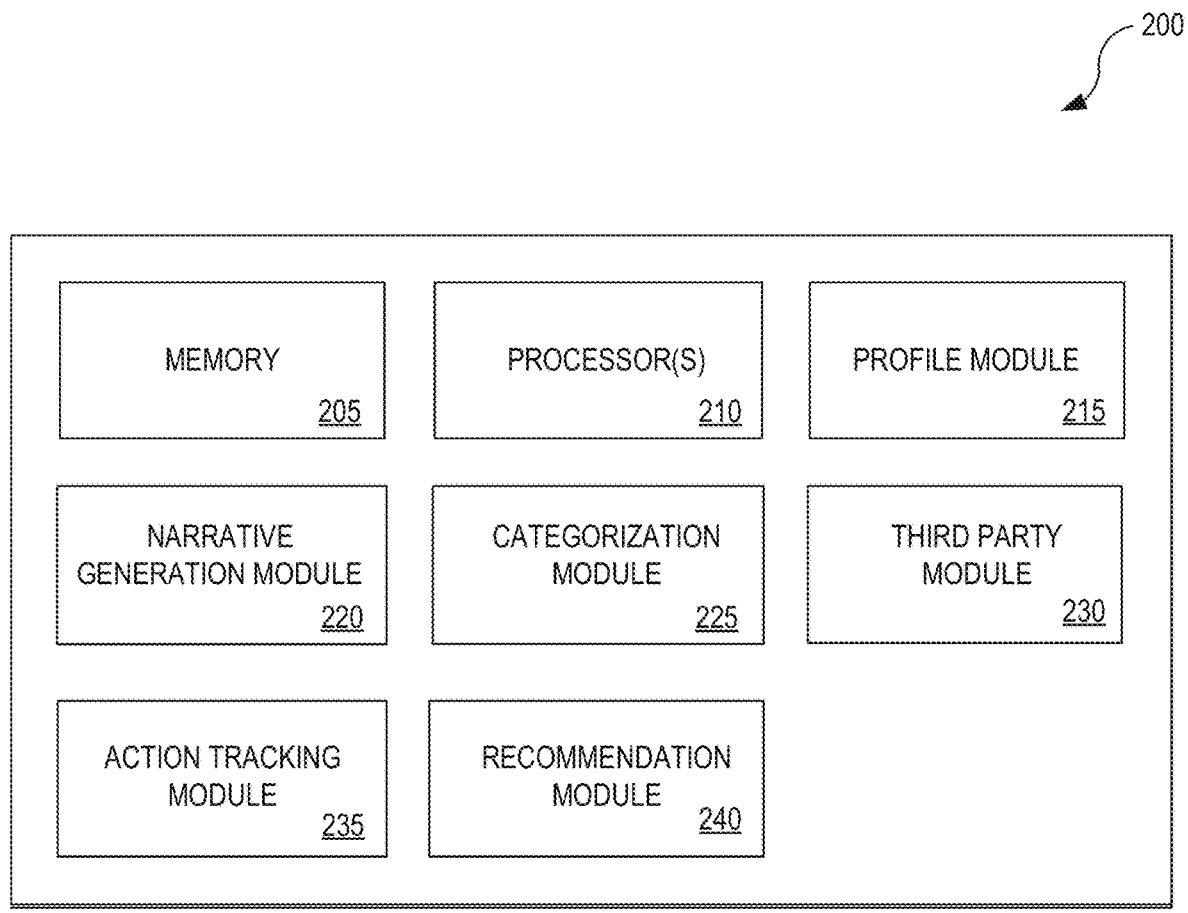
FIG. 2 illustrates various components of a narrative generation platform that may be used in accordance with various embodiments of the present disclosure.

FIG. 2 illustrates a set of components 200 within narrative generation platform 120 according to one or more embodiments of the present disclosure. According to the embodiments shown in FIG. 2, narrative generation platform 120 can include memory 205, one or more processors 210, profile module 215, narrative generation module 220, categorization module 225, third party module 230, action tracking module 235, and recommendation module 240. Other embodiments of the present disclosure may include some, all, or none of these modules and components, along with other modules, applications, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of profile module 215, narrative generation module 220, categorization module 225, third party module 230, action tracking module 235, and recommendation module 240. Generally, memory 205 can include any device, mechanism, or populated data structure used for storing information. In accordance with some embodiments of the present disclosure, memory 205 can encompass, but is not limited to, any type of volatile memory, nonvolatile memory (RAM), and dynamic memory. For example, memory 205 can be RAM, memory storage devices, optical memory devices, magnetic media, floppy disks, magnetic tapes, hard drives, single in-line memory modules (SIMMs), synchronous dynamic random access memory (SDRAM), dual in-line memory modules (DIMMs), Rambus dynamic random access memory (RDRAM), double data rate RAM (DDR RAM), small outline DIMMs (SODIMMs), EPROMs, EEPROMs, compact discs, digital video discs, and/or the like. In accordance with some embodiments, memory 205 may include one or more disk drives, one or more flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Profile module 215 can maintain personal and financial profiles for a user. Personal data of a user can include a name, an address, a phone number, an email address, a unique identification number identifying a user, a photograph of the user, and login credentials such as a username and password for launching an application. Profiles may include a user's personal data; bank/financial institution data; credit card/debit card data, including electronic wallet identification information; insurance policies that the user has purchased; a user's annual income; a user's financial information, including financial transactions made by a user; information about a user's family members, including their financial and personal data; information about financial goals and life events of a user; and information about a user or any other information that can be used to identify a user. In some embodiments, profile module 215 can determine whether a user's information can be identified as a user population criterion (e.g., user demographic data) or a user-specific criterion (e.g., a user's annual salary data). Profile module 215 can receive information from narrative generation platform 120 that assigns a user to a user category. Additionally, profile module 215 can continually update the stored profile as a user's financial goals, plans, and life events change over time.

Narrative generation module 220 can generate narratives automatically. A narrative can be accessed, for example, by making an API call or a URL call or via a software development kit (SDK). In some embodiments, a set of narratives (e.g., stored in a database) can be appended or augmented with newly generated narratives. In some embodiments, narratives can be created manually based on business rules and logic entered by individuals on user data. In some embodiments, narratives can be generated electronically by a computer upon automatic execution of the business rules and logic on user data. In some embodiments, the generated narratives can be dynamically modified, updated, or deleted based on the system detecting additions, modifications, or updates to the data.

In some embodiments, narrative generation module 220 (along with other suitable software components) can be licensed to other entities or organizations as an electronic tool or software program. In some embodiments, the disclosed tool can be in the form of a drag-and-drop graphical user interface (GUI) that is user-friendly to operate by an average person (e.g., not necessarily a system admin or IT specialist). In some embodiments, the drag-and-drop interface is an intuitive interface to formulate hypotheses (e.g., test cases of narratives) for testing which narratives are more effective than others by a department manager or a team leader. The outcome of hypothesis testing provides the knowledge to a department manager or a team leader as to which narratives are more effective than others to elicit user response/feedback. For example, a department manager or a team leader can specify, using the tool, what questions he or she would like users to answer. Such questions can be simple queries, thereby eliminating the need for possessing knowledge of computer programming language (e.g., a relational database system such as Microsoft SQL Server, IBM DB2, Oracle, MySQL, or Microsoft Access). The answers to the questions are presented in simple English and do not necessarily involve the use of complex graphs or charts or complicated visual displays. Such answers, for example, can help identify market trends and help with business aspects of decision-making that can be critical in determining the future direction or focus of a company or an organization.

In some embodiments, the narratives (generated by the disclosed tool or system) can be created in a step-wise manner (e.g., as a decision tree) based on applying one or more business rules and logic to the underlying data in a database or a data set. A decision tree for generating narratives can be viewed and used to generate the narratives. For example, for organizations providing financial services such as banking or insurance, the system can identify a user who has saved less than average for a particular week by analyzing the user's weekly financial transaction data. The system, for example, can generate a narrative that says "Hey John, you've only saved $5 this week. What's going on? Do you need help with financial planning? The phone number for financial planning services is 123-456-7890. Feel free to contact us." Such a narrative can be sent by the disclosed system to user John via an email, a letter in the mail, or a push notification displayed on a financial portal when John logs in using the website or a mobile application. The business rules or logic for generating this narrative can include the following: if a member has saved less this week than his average, then deploy the following narrative to the member: "Hey <member name>, you've only saved <monetary amount saved> this week. What's going on? Do you need help with financial planning? The phone number for financial planning services is <phone number>. Feel free to contact us." In the above example narrative, the text included within the "<>" tags can be completed based on user-specific data and/or user population data.

A narrative can be dynamically generated on-the-fly or pre-stored along with other narratives in a database. Furthermore, such narratives can be applied for a specific user population that meets certain demographic or user population criteria (e.g., users who are less than twenty-five years old and earn less than $50,000 a year). In some embodiments, such narratives can apply (or be customized) for individual users (e.g., a member named John). In some embodiments, the criteria can be based on a member's employment status, age, demographics, financial goals, marital status, educational qualifications, annual income, average monthly savings, amount of total credit card debt, number of family members, number of children in family, number of infants in family, names of family members, and other such information. For example, if the system identifies that a member has three children, a narrative can be generated that recites: "To ensure financial security throughout the future for David, Bob and James, we recommend the College Savings financial instrument for you" and a link may be provided next to the message when the message is delivered to the member. Narrative generation module 220 communicates with profile module 215, categorization module 225, third party module 230, action tracking module 235, and recommendation module 240.

Categorization module 225 classifies a generated narrative into "categories" based on user population criteria or user-specific criteria, or a combination thereof. For example, a first narrative can be deployed to users whose monthly savings are above a threshold amount. A second narrative can be deployed to a subset of the user group in which users in the subset satisfy a condition that their monthly savings is above a threshold and the users in the subset also do not have any children or dependent family members. Thus, a category can be associated with one or more variables in the user population criteria and/or user-specific criteria. In some embodiments, deployment of a narrative can be based on heuristics or randomly selecting a narrative in that bucket. In some embodiments, the same narrative can be deployed more than once to a user population, regardless of whether that narrative has been deployed in the respective population or not.

Third party module 230 stores profiles of third parties, clickable links, and application programs associated with the third parties, and such links and programs facilitate the user's completion of trackable actions. Third party module 230 can be continually updated with new data and programs as new actions are added to the system or as new third parties are added. In some embodiments, third party computer 135 can provide information relating to a user that can be received by third party module 230. Such information can be communicated to profile module 215. Third party module 230 communicates with action tracking module 235.

Action tracking module 235 tracks actions that are taken/performed by the user in connection with the deployed narrative. For example, action tracking module 235 can detect if the user has clicked on a clickable link or transferred money from a checking account to a savings account. An identifier can be included with the narrative such that the action is trackable to that user. Accordingly, such actions can be performed by the user at third party computer 135. The detection can be based on verification information received from third party computer 135 that the user has completed the one or more actions. In some embodiments, certain verification information can be conveyed to narrative generation platform 120 as an indication that the user has completed the one or more actions—for example, that the user has selected a clickable link at third party computer 135 or watched a video at the clickable link.

Recommendation module 240 generates recommendations and predictions pertaining to events. After a narrative is deployed to a user population, one or more users in the user population perform an action. In response to receiving information relating to the trackable actions, the disclosed system can send recommendations and predictions to a user. For example, if the event is paying off a credit card, recommendation module 240 can recommend paying off the credit card with a different credit card if the interest rate on the second credit card is lower than the first credit card. Recommendation module 240 can also recommend a financial plan for the user based on his or her expenses/income/spending habits/lifestyle and additionally upon considering the financial impact of life events (e.g., death of a working spouse, planning a baby, and other life events). For instance, recommendation module 240 communicates with profile module 215, narrative generation module 220, third party module 230, and action tracking module 235 to generate recommendations and predictions.

In some embodiments, recommendations and predictions are generated using machine learning (e.g., using methodologies such as artificial neural networks, support vector machines, and Naive Bayes classifiers) on the event data where the events can include life events. That is, the system generates an initial set of recommendations and predictions based on an initial data set (e.g., training data). The initial set of recommendations and predictions are updated as more data is collected. In some embodiments, recommendation module 240 uses Monte Carlo simulation methodologies to generate recommendations for the user based on life event data for the user—such data being received from the user, third parties (e.g., banks, financial institutions, social media networks, etc.), or a combination thereof.

Recommendation module 240 may provide recommendations as to how to meet the user's financial goals or to ensure that bills are paid. Recommendation module 240 may further provide recommendations as to how to spend/save to retire on a certain date, the order in which to pay off credit card debt, when to purchase a home and what type of loan to incur, when to begin purchasing items in preparation for having a child, things to do when leaving the military or armed forces, how to save for retirement, and various other plans or goals that a user may have. In some embodiments, narrative generation platform 120 can invoke the help of a financial planner or advisor for providing recommendations (in lieu of or in addition to the recommendations by recommendation module 240).

Figure 3:
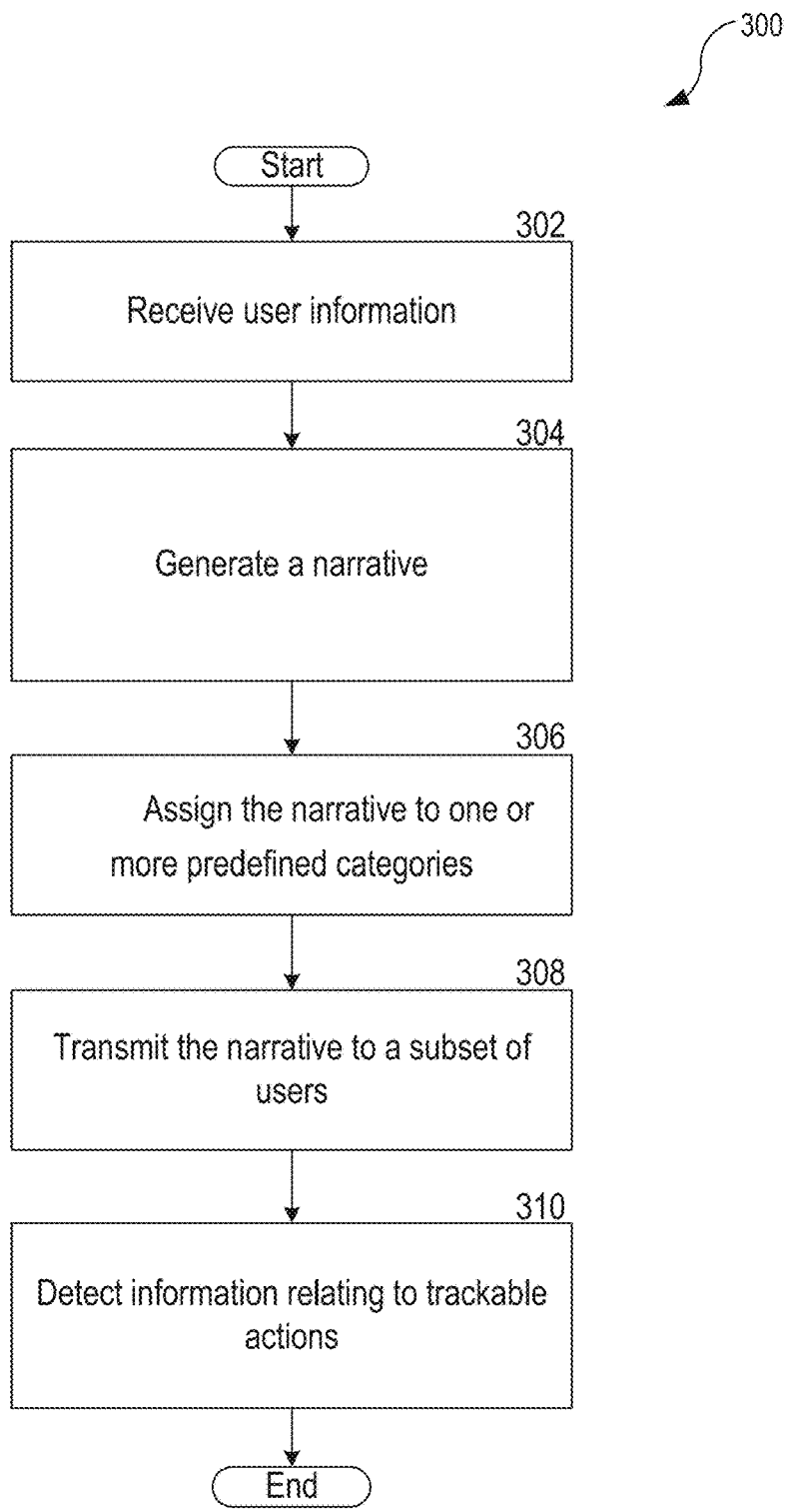
FIG. 3 is a flowchart illustrating a set of operations for narrative generation in accordance with various embodiments of the present disclosure.

FIG. 3 is a flowchart illustrating sets of operations by narrative generation platform 120. In some embodiments, fewer than all of the operations in each set of operations are performed, whereas in other embodiments additional operations are performed. Moreover, in some embodiments, the operations may be performed in different orders or in parallel. The operations can be performed by various components of narrative generation platform 120 such as those illustrated in FIG. 2.

Receive operation 302 receives information relating to users (i.e., user information) in a user population. Such information, for example, can be user population data (e.g., demographic data) or user-specific data (e.g., a user's annual income). In response to determining that a subset of the information satisfies one or more criteria, generate operation 304 generates a narrative corresponding to the subset of the information by applying business rules. Examples of business rules can involve IF-THEN or IF-THEN-ELSE constructions (or syntaxes) and can involve one or more variables or metrics. Such variables and/or metrics can be obtained directly as part of the user information. In some embodiments, the variables and/or metrics can be mathematical functions of the data in the user information. In some embodiments, the one or more criteria are predefined by an individual operating the system based on business needs and requirements. In some embodiments, the one or more criteria can be identified automatically by the system—for example, by applying artificial intelligence or natural language processing methodologies to the data in the user information.

Assign operation 306 assigns the narrative to one or more predefined categories defined based on the one or more criteria. Transmit operation 308 transmits the narrative to a subset of the users associated with the subset of the information. In some embodiments, the system generates more than one narrative, which are also transmitted to the subset of the users. One or more of these narratives can be generated on-the-fly, or they can be pre-stored narratives retrieved from a database. After receiving the narrative, the subset of the users receiving the narrative performs trackable actions (or, in some embodiments, no actions). Detect operation 310 detects information relating to these trackable actions performed by the subset of the users. In some embodiments, a trackable action can be reviewing an email, reviewing information displayed on a portal accessible by a mobile application or a browser, watching multimedia content, listening to an audio clip, calling a planner or a consultant, transferring money from one financial account to another, making a payment to a financial card, or any suitable action. In some embodiments, the trackable option can be performed by the user at a third party computer (e.g., at a bank or a financial institution's portal).

FIG. 4 is a screenshot of interface 400 associated with narrative generation platform 120 in accordance with various embodiments of the present disclosure. Interface 400 (blank) in FIG. 4 shows the various controls, menu options, and metrics and a region on the interface where a narrative can be generated. For example, region 402 of interface 400 is where a decision tree associated with the narrative will be displayed to an admin operator (e.g., an individual creating the narrative) of the system. Region 404 of interface 400 shows example metrics associated with narrative generation.

These metrics can be structured according to the needs and requirements of various departments or divisions in an organization. In some embodiments, these metrics can be derived from promotional marketing campaigns for goods or services. In some embodiments, these metrics can be derived from mobile applications, online calculators, or electronic tools relating to goods or services offered by an organization. In some embodiments, the interface is a drag-and-drop interface to formulate hypotheses (e.g., test cases of narratives) for testing which narratives are more effective than others.

Figure 5A:
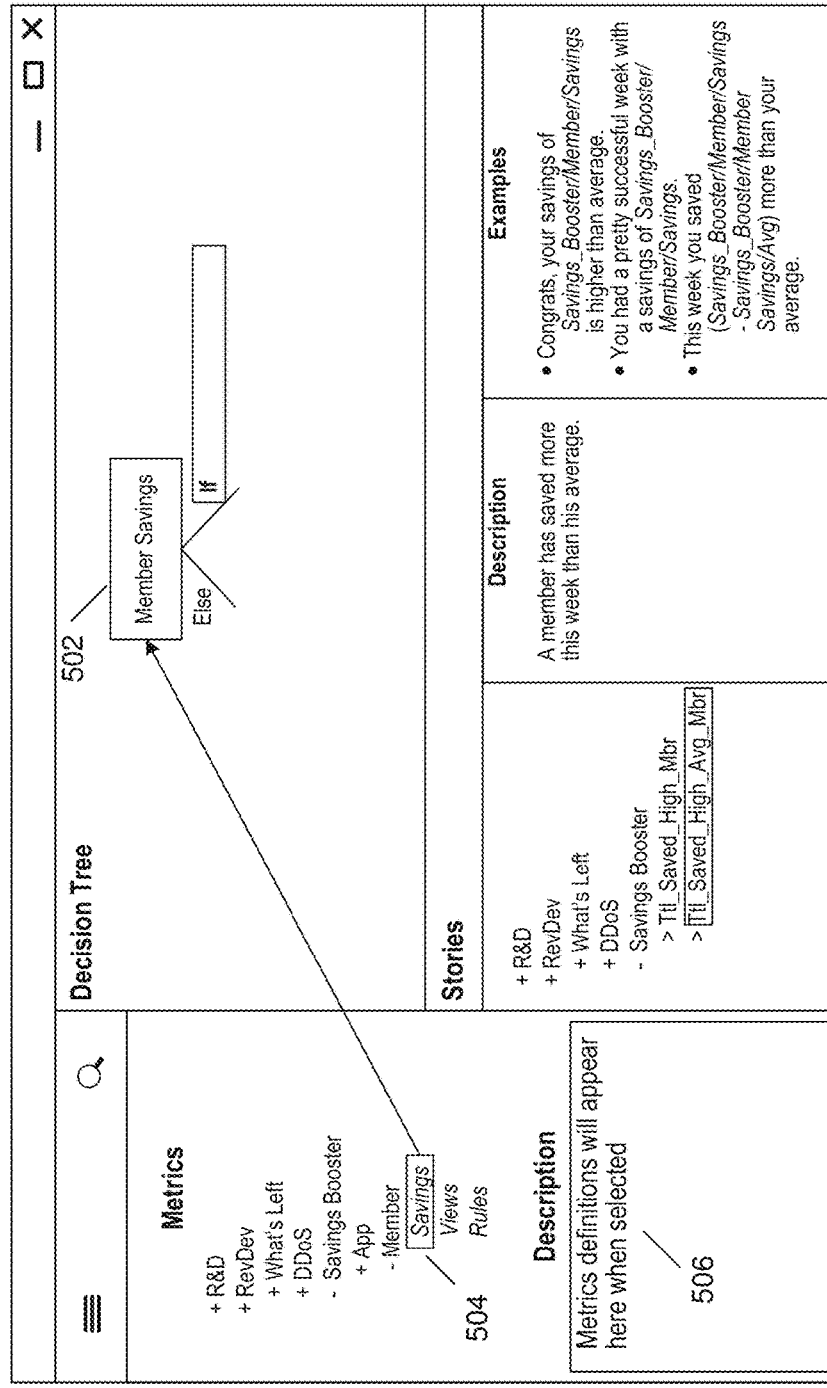
Figure 5B:
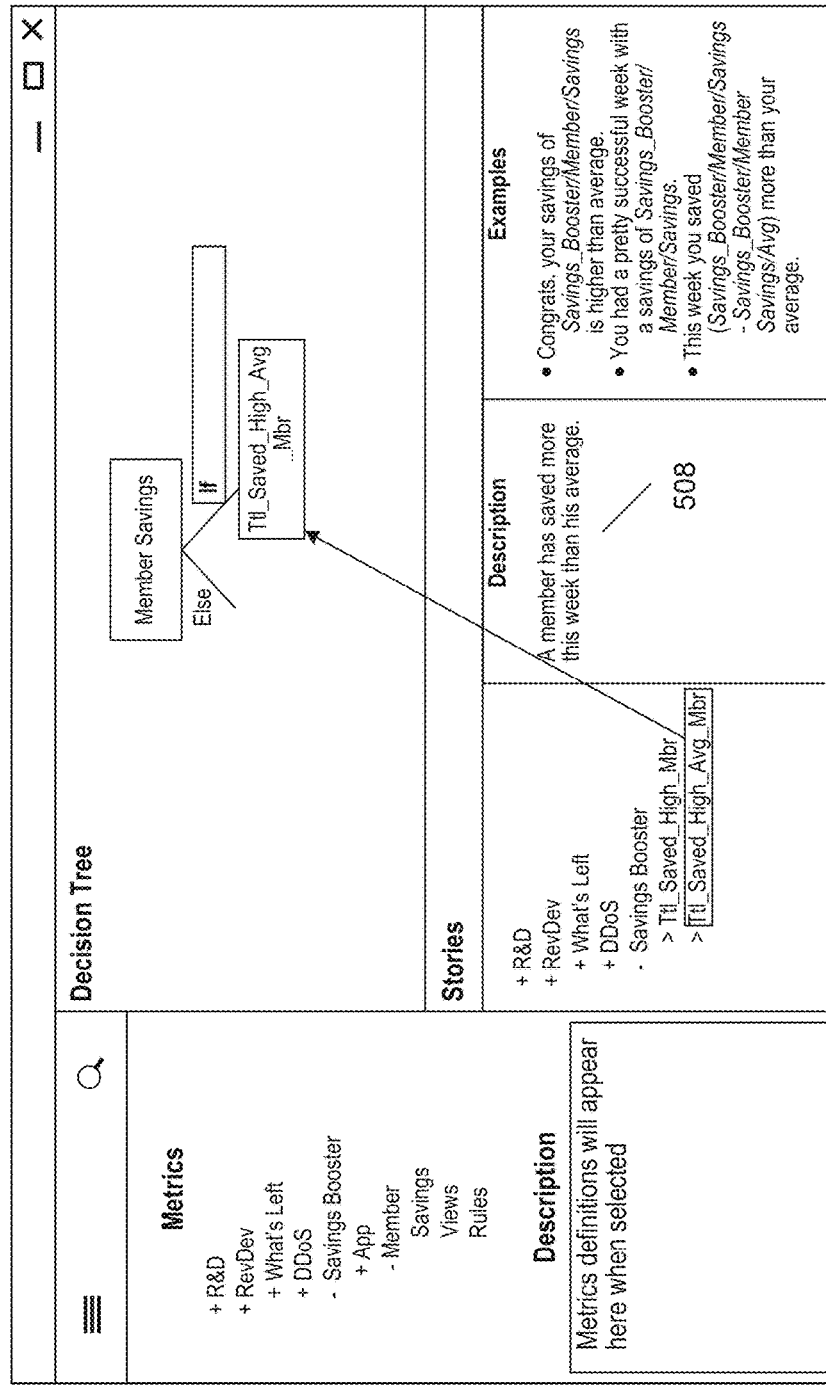

FIGS. 5A-5C are screenshots of interfaces 500A-500C showing an example narrative generation in accordance with various embodiments of the present disclosure. For example, as shown in FIG. 5A, when an operator clicks on a Member Savings metric (in region 504) of interface 500A, the decision tree gets populated with this metric (in region 502), giving rise to two offshoot branches corresponding to an IF branch and an ELSE branch. In region 506, the definitions of the metrics are displayed. In FIG. 5B, the operator enters the rule "IF THIS>THIS/Avg" in the IF branch. The THIS variable in FIG. 5B points to a variable Ttl_Saved_High_Avg_Mbr. This variable indicates a total amount saved by the member in a week. The Avg variable points to an average (e.g., over a certain amount of time) of the member's savings.

The Description in region 508 of FIG. 5B indicates a description of the business rule applied. FIG. 5C displays an example narrative generated using the rules shown in FIG. 5B. The example narrative is shown in regions 510 and 512 of FIG. 5C. The example narrative includes four sentences: "Congrats, your savings of Savings-Booster/Member/Savings is higher than your average. You had pretty successful week with savings of Savings_Booster/Member/Savings. This week you saved (Savings_Booster/Member/Savings-Savings_Booster/Member/Savings/Avg) more than your average. Your average Savings is Savings_Booster/Member/Savings/Avg." This narrative, for example, can be included in an email, a report, or a push notification and sent to one or more users that meet the criteria of saving more than the user's average that particular week. It will be appreciated from the above-mentioned example that the portion of the narrative that states "Congrats, your savings of . . . " in the example narrative is not generated by a human being but is machine-generated. Similarly, it can also be appreciated that several other portions of the narrative are machine-generated. In some embodiments, the portion of the narrative that states "Congrats, your savings of . . . " in the example narrative is stored in a database and is associated with various categories. One such category is a "member cost savings" category.

In some embodiments, a narrative can include multiple metrics and can also involve multiple business rules. Although the screenshots in FIGS. 4 and 5A-5C pertain to an interface that is displayed to a system administrator or an operator, in some embodiments, a narrative is not necessarily displayed on an interface and can be transmitted to users after being automatically generated. In some embodiments, a metric (e.g., a Member Savings metric) can be related to the one or more criteria that are used for classifying a generated narrative into a category.

COMPUTER SYSTEM OVERVIEW

Figure 6:
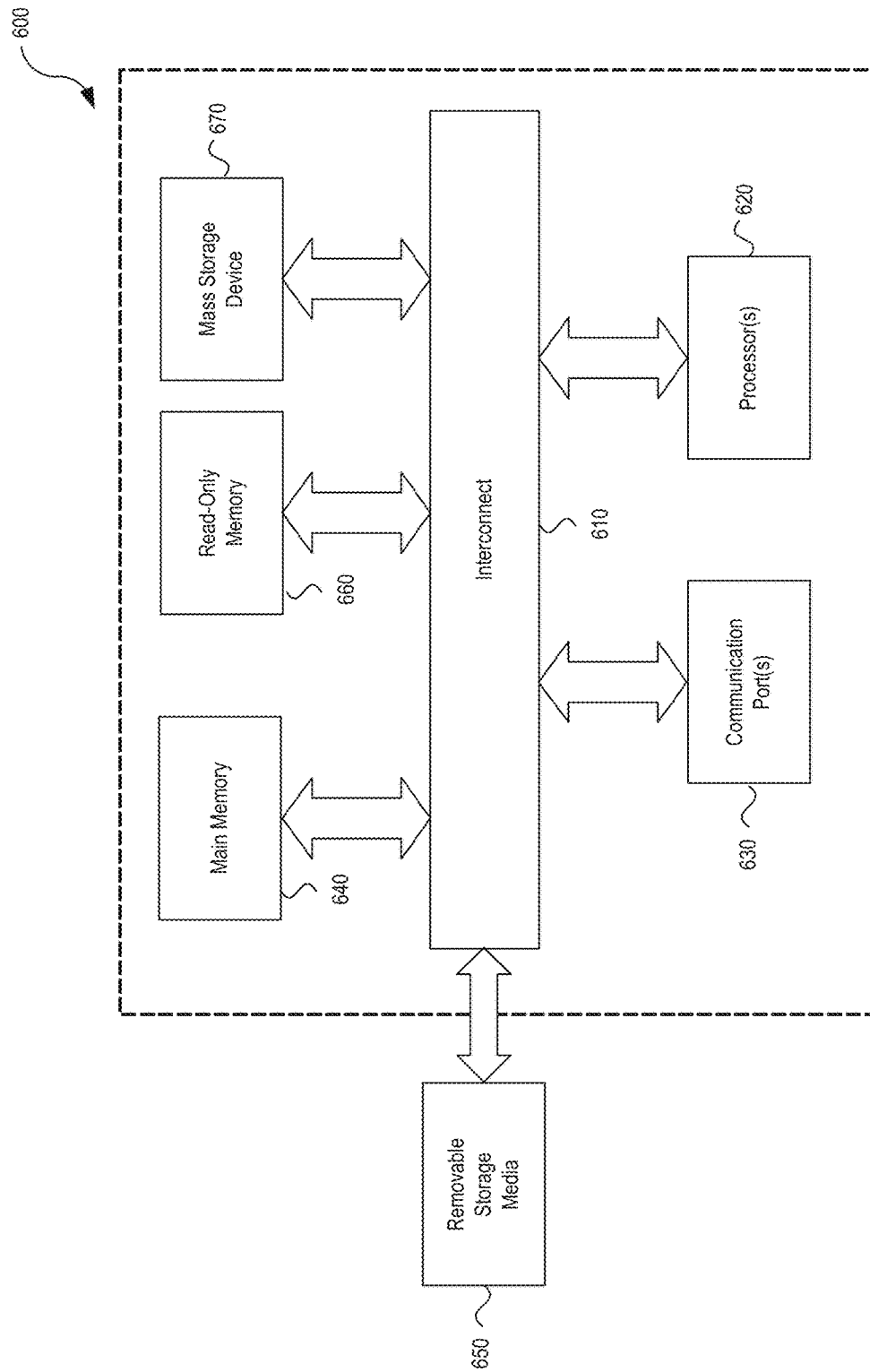
FIG. 6 illustrates an example of a computer system with which some embodiments of the present disclosure may be utilized.

Embodiments of the present disclosure include various steps and operations, which have been described above. A variety of these steps and operations may be performed by hardware components or they may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 6 is an example of a computer system 600 with which embodiments of the present disclosure may be utilized. According to the present example, computer system 600 includes an interconnect 610, at least one processor 620, at least one communication port 630, a main memory 640, a removable storage media 650, a read-only memory 660, and a mass storage device 670.

Processor(s) 620 can be any known processor, such as, but not limited to, Intel® Itanium® or Itanium 2® processor(s), or AMD® Opteron® or Athlon MP® processor(s), or Motorola® lines of processors. Communication port(s) 630 can be any RS-232 port for use with a modem-based dialup connection, a 10/100 Ethernet port, or a Gigabit port using copper or fiber. Communication port(s) 630 may be chosen, depending on a network such as a LAN, WAN, or any network to which computer system 600 connects.

Main memory 640 can be RAM or any other dynamic storage device(s) commonly known in the art. Read-only memory 660 can be any static storage device(s), such as programmable read-only memory (PROM) chips for storing static information, such as instructions for processor(s) 620.

Mass storage device 670 can be used to store information and instructions. For example, hard disks such as the Adaptec® family of SCSI drives, an optical disc, an array of disks such as RAID, the Adaptec family of RAID drives, or any other mass storage devices may be used.

Interconnect 610 communicatively couples processor(s) 620 with the other memory, storage, and communication blocks. Interconnect 610 can be a PCI/PCI-X- or SCSI-based system bus, depending on the storage devices used.

Removable storage media 650 can be any kind of external hard drive, floppy drive, USB drive, OMEGA® Zip Drive, CD-ROM, compact disc re-writable (CD-RW), or digital video disc read-only memory (DVD-ROM).

The components described above are meant to exemplify some types of possibilities. In no way should the aforementioned examples limit the disclosure, as they are only exemplary embodiments.

TERMINOLOGY

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed between them, while not sharing any physical connection with one another. Based on the disclosure provided herein, someone of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states that a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communication between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as someone skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

In conclusion, the present disclosure discloses novel systems, methods, and arrangements for generating narratives electronically and tracking reactions of actions taken by a user to one or more selected narratives customized for the user. While detailed descriptions of one or more embodiments of the present disclosure have been given above, various alternatives, modifications, and equivalents will be apparent to someone skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A non-transitory computer-readable medium comprising a set of instructions that, when executed by one or more processors, cause a machine to perform the operations of:
   receiving, at a server, information relating to users in a user population from one or more data sources;
   in response to determining that a subset of the information satisfies one or more criteria, generating a narrative corresponding to the subset of the information by applying business rules to the information,
      wherein the narrative is generated using a decision tree,
      wherein the decision tree and the business rules are displayed on a graphical user interface (GUI),
      wherein the GUI includes a main window and a side bar adjacent to the main window,
      wherein the business rules are displayed in the side bar and movable from the side bar into the main window according to a drag-and-drop mechanism,
      wherein the business rules include conditions for transmitting the narrative,
      wherein generating the narrative includes receiving, via the drag-and-drop mechanism, the conditions for transmitting the narrative;
   assigning the narrative to one or more predefined categories, the one or more predefined categories defined based on the one or more criteria;
   transmitting the narrative to a first group of the users associated with the subset of the information according to the conditions;
   detecting information relating to trackable actions of a financial event performed by a subset of the first group of the users in response to the first group of the users receiving the narrative, wherein the subset of the first group of users is associated with a demographic;
   determining an effectiveness rating of the narrative based on a ratio of a number of the subset of users to a number of the first group of users performing the trackable actions;
   generating an updated narrative based on applying the detected information relating to the trackable actions of the financial event to the decision tree, and the determined effectiveness rating;
   transmitting the updated narrative to a second group of users associated with the demographic;
   receiving a user response to the updated narrative; and
   sending a recommendation and/or a prediction to the second group of users based on the user response to the updated narrative.

2. The non-transitory computer-readable medium of claim 1, wherein the narrative includes one or more sentences.

3. The non-transitory computer-readable medium of claim 1, wherein the subset is a first subset, the one or more criteria is a first set of criteria, the subset of the first group of users associated with the subset of the information is a first user subset, and the information relating to the trackable actions is a first trackable information, wherein the set of instructions, when executed by the one or more processors, further cause the machine to perform the operations of:
   in response to determining that a second subset of the information satisfies a second set of criteria, generating a second narrative corresponding to the second subset of the information by applying the business rules to the information;

assigning the second narrative to the one or more predefined categories, the one or more predefined categories defined based on the second set of criteria;

transmitting the second narrative to a second user subset;

detecting a second trackable information relating to trackable actions performed by the second user subset in response to the second user subset receiving the second narrative; and comparing the first trackable information with the second trackable information to determine whether the narrative or the second narrative should be used.

4. The non-transitory computer-readable medium of claim 1, wherein the set of instructions, when executed by the one or more processors, further cause the machine to perform the operations of:

revising the narrative based at least on the information relating to the trackable actions performed by the subset of the first group of users.

5. The non-transitory computer-readable medium of claim 1, wherein the decision tree utilizes at least one IF-THEN construction.

6. The non-transitory computer-readable medium of claim 1, wherein the narrative is included in one or more of the following: an email, an electronic document, or a notification on a web portal accessible via a mobile application program or a website hosted at the server.

7. The non-transitory computer-readable medium of claim 1, wherein the one or more data sources are selected from: a third party database storing publicly available or privately available information relating to the user, a user in the user population, a bank, a financial institution, an insurance provider, or a social media network.

8. The non-transitory computer-readable medium of claim 1, wherein the trackable actions performed by the subset of the first group of users are in real time or almost real time.

9. The non-transitory computer-readable medium of claim 1, wherein the narrative is stored in a database along with additional narratives, the additional narratives associated with the one or more predefined categories.

10. A method implemented by a computer server comprising:

receiving, at a server, information relating to users in a user population from one or more data sources;

in response to determining that a subset of the information satisfies one or more criteria, generating a narrative corresponding to the subset of the information by applying business rules to the information, wherein the narrative is generated using a decision tree, wherein the decision tree and the business rules are displayed on a graphical user interface (GUI), wherein the GUI includes a main window and a side bar adjacent to the main window, wherein the business rules are displayed in the side bar and movable from the side bar into the main window according to a drag-and-drop mechanism, wherein the business rules include conditions for transmitting the narrative, wherein generating the narrative includes receiving, via the drag-and-drop mechanism, the conditions for transmitting the narrative;

assigning the narrative to one or more predefined categories, the one or more predefined categories defined based on the one or more criteria;

transmitting the narrative to a first group of the users associated with the subset of the information according to the conditions;

detecting information relating to trackable actions of a financial event performed by a subset of the first group of the users in response to the first group of the users receiving the narrative, wherein the subset of the first group of users is associated with a demographic;

determining an effectiveness rating of the narrative based on a ratio of a number of the subset of users to a number of the first group of users performing the trackable actions;

generating an updated narrative based on applying the detected information relating to the trackable actions of the financial event to the decision tree, and the determined effectiveness rating;

transmitting the updated narrative to a second group of users associated with the demographic;

receiving a user response to the updated narrative; and sending a recommendation and/or a prediction to the second group of users based on the user response to the updated narrative.

11. The method of claim 10, wherein the subset is a first subset, the one or more criteria is a first set of criteria, the subset of the first group of users associated with the subset of the information is a first user subset, and the information relating to the trackable actions is a first trackable information, wherein the method further comprises:

in response to determining that a second subset of the information satisfies a second set of criteria, generating a second narrative corresponding to the second subset of the information by applying the business rules to the information;

assigning the second narrative to the one or more predefined categories, the one or more predefined categories defined based on the second set of criteria;

transmitting the second narrative to a second user subset;

detecting a second trackable information relating to trackable actions performed by the second user subset in response to the second user subset receiving the second narrative; and comparing the first trackable information with the second trackable information to determine whether the narrative or the second narrative should be used.

12. The method of claim 10, wherein the narrative includes one or more sentences.

13. A computer server comprising:

a memory; and a processor configured to perform the operations of:

receiving, at a server, information relating to users in a user population from one or more data sources;

in response to determining that a subset of the information satisfies one or more criteria, generating a narrative corresponding to the subset of the information by applying business rules to the information, wherein the narrative is generated using a decision tree, wherein the decision tree and the business rules are displayed on a graphical user interface (GUI), wherein the GUI includes a main window and a side bar adjacent to the main window, wherein the business rules are displayed in the side bar and movable from the side bar into the main window according to a drag-and-drop mechanism, wherein the business rules include conditions for transmitting the narrative, wherein generating the narrative includes receiving, via the drag-and-drop mechanism, the conditions for transmitting the narrative;

assigning the narrative to one or more predefined categories, the one or more predefined categories defined based on the one or more criteria;

transmitting the narrative to a first group of the users associated with the subset of the information according to the conditions;

detecting information relating to trackable actions of a financial event performed by a subset of the first group of the users in response to the first group of the users receiving the narrative, wherein the subset of the first group of users is associated with a demographic;

determining an effectiveness rating of the narrative based on a ratio of a number of the subset of users to a number of the first group of users performing the trackable actions;

generating an updated narrative based on applying the detected information relating to the trackable actions of the financial event to the decision tree, and the determined effectiveness rating;

transmitting the updated narrative to a second group of users associated with the demographic;

receiving a user response to the updated narrative; and sending a recommendation and/or a prediction to the second group of users based on the user response to the updated narrative.

14. The computer server of claim 13, wherein the decision tree utilizes at least one IF-THEN construction.

15. The computer server of claim 13, wherein the narrative is included in one or more of the following: an email, an electronic document, or a notification on a web portal accessible via a mobile application program or a website hosted at the computer server.

16. The method of claim 10, the method further comprising determining, for each user in the subset of the first group of users associated with the subset of the information, a date to transmit the narrative based on a date of a deposit into a financial account of the each user in the subset of the first group of users.

17. The method of claim 10, wherein the conditions for transmitting the narrative include detecting, for a user, a savings of a higher amount than average for the user over a period of time, wherein the narrative is sent to the user after detecting the savings of the higher amount than average for the user over the period of time.

18. The non-transitory computer-readable medium of claim 1, further comprising:

detecting additional information relating to the trackable actions performed by the subset of the first group of users; and sending an updated recommendation and an updated prediction to the subset of the first group of users based on the detected additional information relating to the trackable actions.

19. The method of claim 10, wherein the updated narrative is selected based on the effectiveness rating of the narrative.

20. The method of claim 10, wherein the recommendation and/or prediction is generated by applying a machine learning model to the user response to the updated narrative.

* * * * *